April 7, 1970   A. M. FESTER ET AL   3,504,619

DOUGHNUT MAKING MACHINE

Filed April 12, 1968   4 Sheets-Sheet 1

INVENTORS
AMOS M. FESTER
PAUL D. BROGARD
BY Burd, MacEachron, Braddock,
Bartz & Schwartz
ATTORNEYS April 7, 1970  A. M. FESTER ET AL  3,504,619
DOUGHNUT MAKING MACHINE
Filed April 12, 1968  4 Sheets-Sheet 2

INVENTORS
AMOS M. FESTER
PAUL D. BROGARD
BY
Burd, MacEachron, Braddock,
Bartz & Schwartz
ATTORNEYS April 7, 1970     A. M. FESTER ET AL     3,504,619

DOUGHNUT MAKING MACHINE

Filed April 12, 1968     4 Sheets-Sheet 3

INVENTORS
AMOS M. FESTER
PAUL D. BROGARD
BY
Burd, MacEachron, Braddock,
Bartz & Schwartz
ATTORNEYS United States Patent Office 3,504,619
Patented Apr. 7, 1970

3,504,619
DOUGHNUT MAKING MACHINE
Amos M. Fester and Paul D. Brogard, St. Paul, Minn., assignors to Amos' Gold-N-Good Donut Co., Inc., St. Paul, Minn., a corporation of Minnesota
Filed Apr. 12, 1968, Ser. No. 720,896
Int. Cl. A47j 37/12
U.S. Cl. 99—354                    10 Claims

ABSTRACT OF THE DISCLOSURE

A compact table-top automatic doughnut making machine for use at lunch counters and the like where freshly cooked doughnuts are sold in moderately large volume. The machine includes a long relatively deep and narrow tank for containing the cooking fat or oil which is heated by automatic thermostatically controlled means. A dough extruding unit is mounted over one end of the tank to form and drop rings of raw dough into the oil. The dough is moved along the tank to cook on one side, turned over automatically and cooked on the other side, lifted out of the oil to drain and then discharged from the opposite end of the machine. The machine can be readily disassembled for easy cleaning and is characterized by novel transport and turn-over means.

---

This invention relates to a compact automatic doughnut making machine adapted for use on table-top or counter-top in such places as lunch counters, delicatessens, small bakeries and the like where doughnuts are sold in moderately large volume. Prior doughnut making machines have been large, bulky, expensive and adapted to turn out doughnuts in large quantities, or they have been largely small manually operated units adapted for low volume production. There has been no satisfactory machine available heretofore to serve the intermediate demand for moderately large volume production at a reasonable price and not requiring floor space, heavy duty electrical connections and skilled operators; lacking flexibility in meeting varying demand; lacking ease of disassembly for cleaning, etc. The present machine fulfills this long felt need.

The doughnut making machine, according to the present invention, includes an elongated relatively deep vessel adapted to contain a liquid cooking medium and is provided with automatic thermostatically controlled electrical heating means for maintaining the cooking medium at the required temperature. The machine is provided with dough extruding means mounted above one end of the vessel of cooking medium for periodically discharging a formed piece of uncooked dough, the dough extruder being power driven in synchronism with means for moving the dough through the machine. This dough transport means extends lengthwise of the vessel for moving the dough through and out of the cooking medium and discharging the cooked doughnuts from the opposite end of the machine, the dough transport means likewise being power driven. Means are also provided to turn the partially cooked dough to insure uniform cooking from both sides.

The doughnut machine, according to the present invention, is illustrated in the accompanying drawings in which the same numerals are used to identify corresponding parts and in which.

Figure 1:
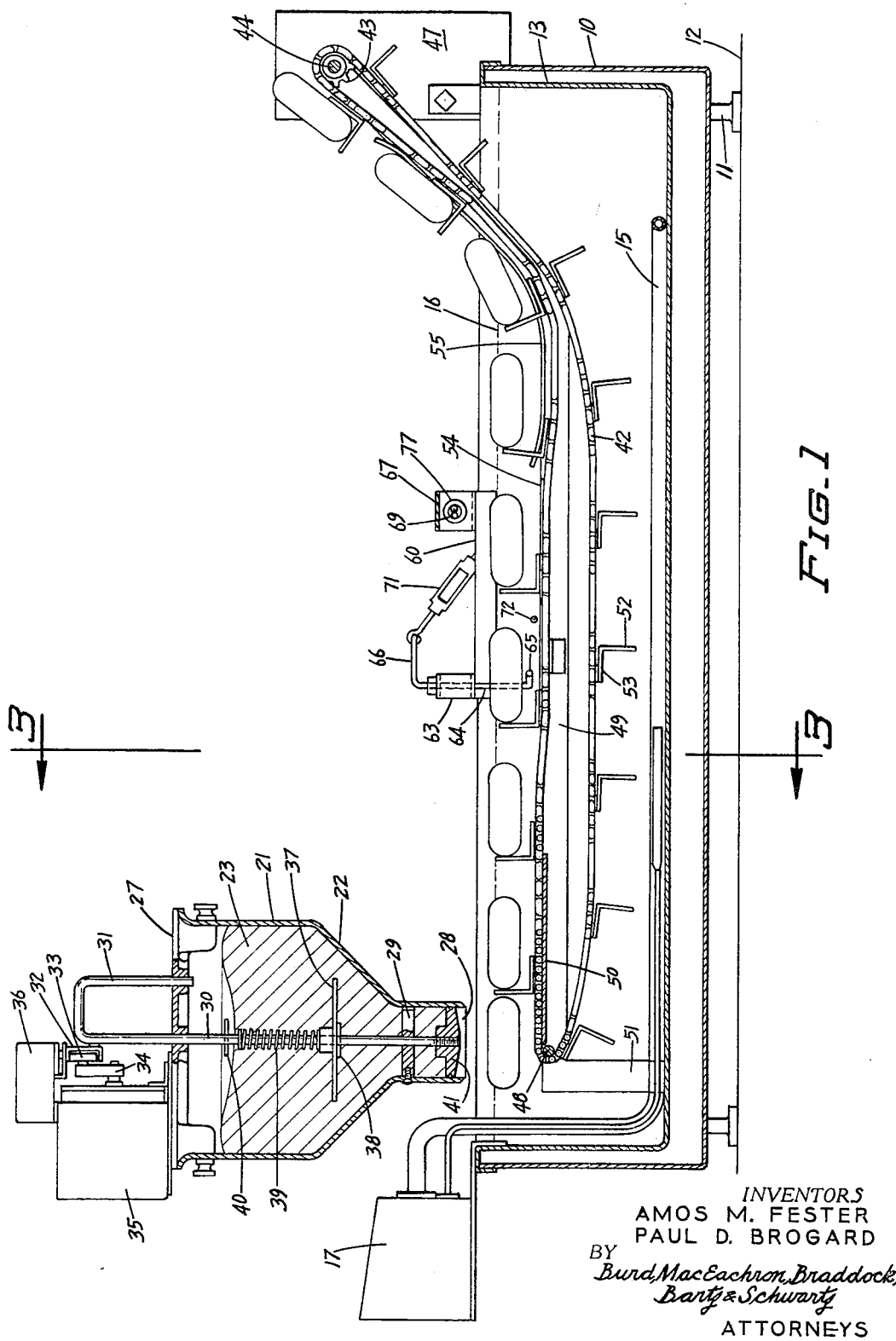
FIGURE 1 is an elevation in section taken longitudinally of the machine.
Figure 2:
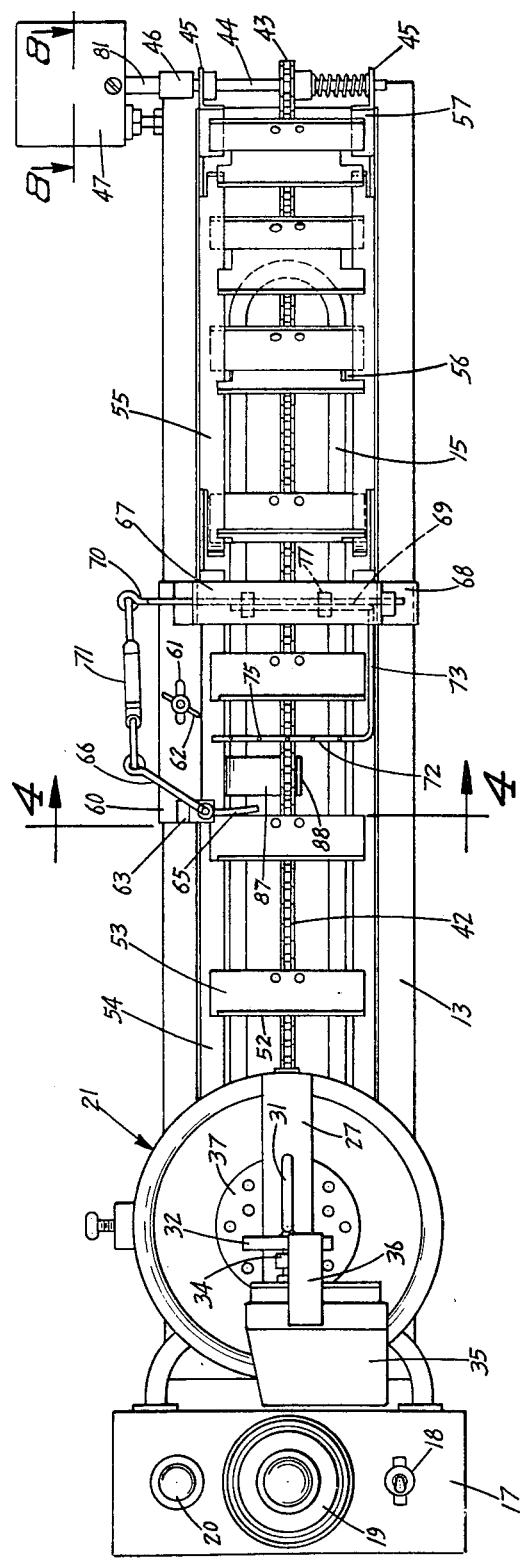
FIGURE 2 is a top plan view.
Figures 3, 8:
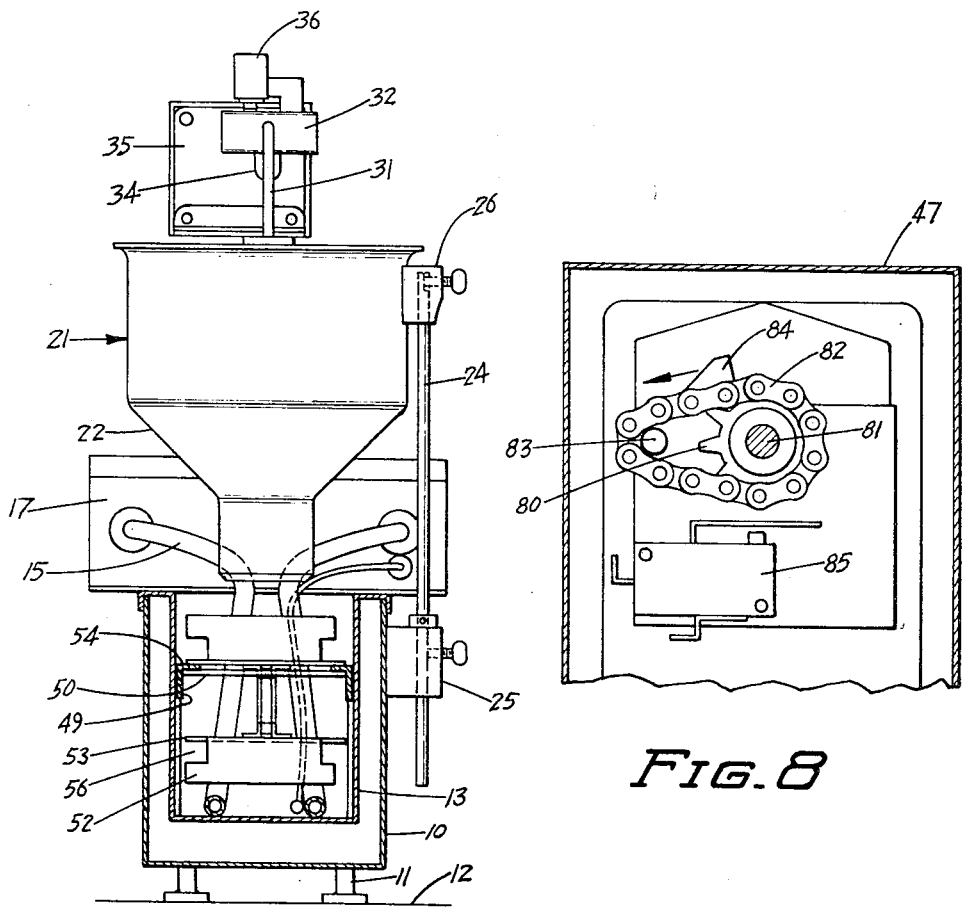
FIGURE 3 is a section, on the line 3—3 of FIGURE 1 and in the direction of the arrows, showing the means for mounting the dough extruding unit.
FIGURE 8 is an enlarged fragmentary section, taken on the line 8—8 of FIGURE 2 and in the direction of the arrows, showing details of the timing system synchronizing operation of the dough extruder with movement of the transport means.

Referring now to the drawings, and particularly FIGURES 1, 2 and 3, the doughnut making machine according to the present invention includes an elongated relatively deep and narrow tank-like vessel including an outer shell 10 having a plurality of feet 11 by which to support the machine on a table-top or counter-top 12. An inner shell 13 of generally the same configuration, but slightly smaller, fits within the outer shell 10, the inner shell being removable for cleaning. The inner shell 13 is provided with a flange around its top periphery which engages the top of outer shell 10 to support the inner shell therein.

An electrical heating element 15 is disposed within the inner shell 13 in order to heat doughnut cooking fat or oil (not shown) to cooking temperature. In the operation of the machine, the inner shell 13 is substantially filled with the liquid heating medium to a level approximating that indicated by the broken line 16. The heating element is thermostatically controlled to maintain the cooking medium at the desired cooking temperature and is connected to a control box 17 which is provided with a switch 18, temperature control knob 19 and pilot light 20, all of which are common and well understood in the electrical heating arts. The main body of the heating element 15 is adapted to rest on the bottom of the inner shell 13 and is supported from the control box 17 which is detachably mounted at one end of the vessel for easy removal for cleaning of the heating element and the inner shell.

A dough extruder, indicated generally at 21, is detachably mounted above one end of the vessel. The general construction of the dough extruder is as described in detail in U.S. Patent No. 2,982,233 issued May 2, 1961 to one of the present joint inventors. A funnel-like hopper 22 serves as a repository for dough 23 to be extruded. Hopper 22 is supported from a rod 24, one end of which is engaged in a clamping means 25 secured to one side of outer shell 10 and the other end of which is engaged by a clamping means 26 secured to the outside wall of the hopper. Clamping engagement of the rod is, for example, as illustrated, by means of thumb screws. The rod 24 is preferably flattened in the areas of engagement by the thumb screws to prevent rotation of the rod or of the hopper on the rod in order to insure alignment of the dough extruder with the vessel.

A frame 27 is detachably mounted across the top of hopper 22 for easy removal of the extruder operating elements for easy cleaning. Hopper 22 has a diminishing conical or funnel portion at its lower end which terminates in a substantially reduced cylindrical tube having an extruding opening 28.

Slidably mounted within the hopper and sliding in frame 27 and a spider 29 at the lower end of the hopper is a central reciprocable vertical shaft 30. Shaft 30 is stabilized against rotation by a guide 31 that is desirably a portion of shaft 30 bent back upon itself and slidably engaged in an opening in the frame 27. Shaft 30 is reciprocated by a simple crank assembly. A channel member 32 is rigidly secured to the top end of shaft 30. Within this channel there is a roller 33 driven in a circular path by being secured to crank arm 34 secured to the drive shaft of an electric motor 35.

Operation of motor 35 causes reciprocation of shaft 30. The motor is turned on by switch means actuated by the means for carrying the dough through the cooking vessel, as will be described in detail hereinafter. At the end of each cycle the motor is turned off as a result of channel 32 actuating switch 36 at the top end of each stroke of shaft 30.

A perforated dough advancing plate 37 is slidably mounted on shaft 30. Downward movement of plate 37 is restricted by a stop, such as cotter pin 38. In a similar manner, upward movement of the plate is also limited except that the upward movement is yieldingly resisted by a suitable resilient means such as spring 39, the upper end of which engages a stop, such as cotter pin 40. A circular cutting disc or plate 41 is carried by the bottom end of shaft 30. The cutting element 41 reciprocates relative to the beveled cutting edge of the extrusion opening 28 to form a spiece of dough in the traditional ring shape upon each reciprocating cycle of shaft 30.

Each formed piece of dough is dropped into the heated cooking medium in the vessel below. As the dough floats on the top of the hot fat or oil, it is carried along the vessel by transport means to be described, turned over in its passage for cooking on both sides, and then carried out of the vessel at the opposite end. The transport means includes an endless sprocket chain 42, one end of which engages a drive sprocket wheel 43 carried on a horizontal shaft 44. Shaft 44 is journaled in a bracket 45 comprising the end of a removable supporting and guiding frame which rests in the inner shell 13 and will be described in greater detail hereinafter.

Sprocket wheel 43 is a drive sprocket and is detachably connected through a coupling 46 to the drive shaft of a reduced speed gear box 47 which in turn incorporates an electric motor. The gear box and motor means is secured to one side of the outer shell 10 adjacent the end of the vessel opposite from the dough extruder. Shaft 44 is spring mounted to permit ready disengagement from coupling 46 and the gear box and motor for removal of the transport means from the vessel for cleaning.

The opposite end of the loop of sprocket chain 42 is supported by a shaft 48 around which the chain slides. If desired, an idler sprocket may be mounted to rotate on or with shaft 48. The opposite ends of shaft 48 are supported in a framework comprised of a pair of spaced apart elongated track supporting members 49 connected at one end by means of a transverse horizontal plate 50 and at the other end by shaft 44 and supported by two feet 51 which rest on the bottom of inner shell 13 at the dough extruding end of the vessel.

The sprocket chain 42 carries a plurality of paddles 52 on its outer perimeter. Paddles 52 are equally spaced apart to define doughnut receiving areas or compartments between adjacent paddles. Each paddle includes a flat base member 53 which extends transversely of the chain and extends substantially across the width of the inner shell 13 with some clearance on both ends. The paddle members 52 extend at right angles from the base members.

Each track supporting member 49 extends horizontally and longitudinally along the inside wall of inner shell 13 for about three-fourths of the length of the vessel and then inclines upwardly at an angle between about 40 and 50 degrees to terminate in brackets 45 at the end of the vessel. Each member 49 carries a plurality of inwardly extending flanges. The first of these flanges 54 extends about two-thirds of the length of the inner shell of the vessel and the ends of the bases 53 of the paddles ride on top of flange 54 in their course of travel from the dough extruder toward the discharge end of the machine.

The next flange segment 55 extends for about a fourth of the length of members 49 and the upstream end thereof is spaced above the downstream end of flange 54 by a distance approximating the thickness of the paddle base 53. As it traverses the length of the vessel, the end of each paddle base which initially rides on top of flange 54, as it leaves that flange passes under flange 55 and thereafter moves along the bottom surface of flange 55 with that flange serving to hold down the paddle bases and the sprocket chain. This permits the paddles to be directed angularly upward toward the discharge end of the machine. Each paddle 52 is provided with a slot 56 at each end to permit the paddles to traverse this hold down portion of the path of movement of the doughnut transport system. The upwardly inclined portion of the track enables the doughnuts to be lifted out of the cooking medium and drained before discharge from the end of the machine.

The final segment of guide track between the upper end of flange members 55 and the end of the machine comprises a pair of inwardly facing flanges 57 whose upper surfaces are spaced downwardly from the lower surface of flanges 55 by about the thickness of the paddle bases 53 so that the bases may emerge from the underside of flanges 55 to ride on the upper surface of flanges 57. As the paddles leave the ends of flanges 57, they make a 180 degree turn and return as a lower flight to the dough extruder end of the machine to begin another doughnut conveying cycle. Just prior to the return of the paddle, the drained doughnut which it has been conveying is tipped off the end of the machine into any suitable receptacle.

The doughnut transport means is maintained lubricated by the cooking fat or oil through which it traverses. The opposite ends of flanges 55 are desirably upturned slightly to facilitate passage of the paddle bases under the flanges and then out from under the flanges. Although the sprocket chain 42 is supported only at its opposite ends, by means of the guide flanges the transport means is enabled to traverse a path with a dog-leg curve.

The dough expelled by the extruder 21 tends to float on top of the hot cooking medium cooking the doughnut from one side. Approximately midway in the course of its passage through the machine, the doughnut must be turned over in order to cook the other side so that it will be cooked uniformly throughout. The turnover means is best understood by reference to FIGURES 4 through 7 where it is shown on an enlarged scale.

The turnover means includes a channel base member 60 adapted to fit over the edge of the cooking medium vessel along one side approximately midway between its ends. The channel member is desirably slotted at 61 for engagement with a threaded stud extending from the top of the side wall of the vessel and fitted with a thumb screw 62 for easy disassembly and removal for cleaning and for precise adjustment of the turnover means relative to the doughnut transport means with which it cooperates.

The upstream end of the base channel 60 supports a bracket 63 in which an actuating crank arm means is journaled for rotation about a vertical axis. The actuating crank arm means includes a vertically disposed central portion 64 which is engaged by bracket 63 for rotation on a vertical axis which extends immediately adjacent to the inside wall of inner vessel shell 13. An actuating arm 65 extends hoizontally from the bottom-most end of the central segment 64 so as to lie in the downstream path of the paddles 52 of the doughnut transport means. The actuating arm 65 is engaged by the inside edge of the slot 56 formed in the end of the paddle 52. At the upper end of the central portion of the actuating crank arm, there is a connecting arm 66 extending generally horizontally but disposed at an obtuse angle of about 135 degrees from the actuating arm 65 and extending in the downstream direction.

A bridge member 67 is secured to the downstream end of base channel 60 and extends up and over the vessel to a channel member 68 which is supported on the opposite side edge of the vessel. Bridge 67 serves as a bracket for journaling a turnover crank arm means for rotation on a horizontal axis extending transverse to the longitudinal axis of the vessel. The lifting crank arm means includes a central segment 69 whose opposite ends are journaled in the downwardly depending legs of the bridge member 67 so as to lie above and across the top of the cooking medium vessel.

One end of the crank arm member 69 projects beyond the bridge member on the same side of the vessel as actuating crank connecting arm 66 and is provided with a simple downwardly extending crank 70. An adjustable link 71 is rotatably connected at opposite ends to the ends of connector arm 66 and crank 70.

A transverse horizontal lifting arm 72 is connected to the opposite end of the central segment of the crank arm by means of a rigid longitudinally extending horizontal link 73 and a rigid vertically extending link 74. In its normal at-rest position, the opposite ends of lifting arm 72 rest upon the track flanges 54. Link 73 extends along flange 54 on one side immediately adjacent to the inside wall of inner shell 13. Link 74 extends vertically immediately adjacent the inside wall of inner shell 13. The length of each paddle 52 is such as to provide clearance past link 74. The upper edge of lifting arm 72 is desirably provided with a plurality of gripping projections 75 to enable the lifting arm to better engage each doughnut to be turned over.

Figure 5:
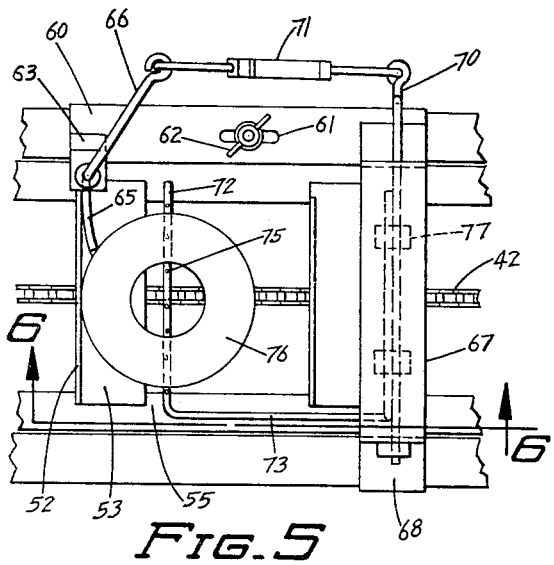
FIGURE 5 is a fragmentary top plan view on an enlarged scale showing details of the doughnut turning mechanism.
Figure 7:
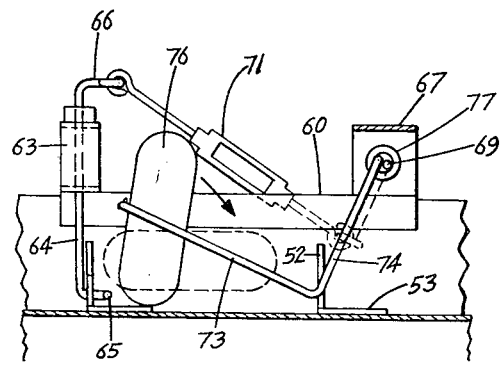
FIGURE 7 is a similar sectional view showing the parts after actuating during the turnover operation.
Figure 6:
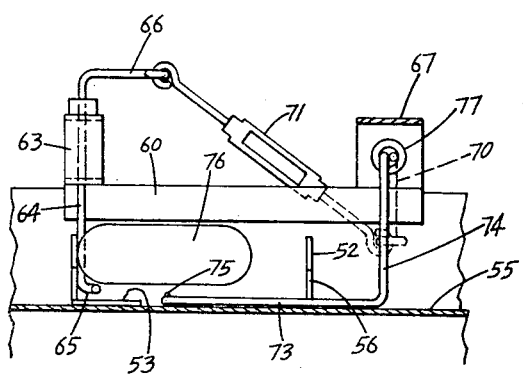
FIGURE 6 is a fragmentary vertical section, on the line 6—6 of FIGURE 5 and in the direction of the arrows, showing the doughnut turning mechanism just prior to actuation.
Figure 4:
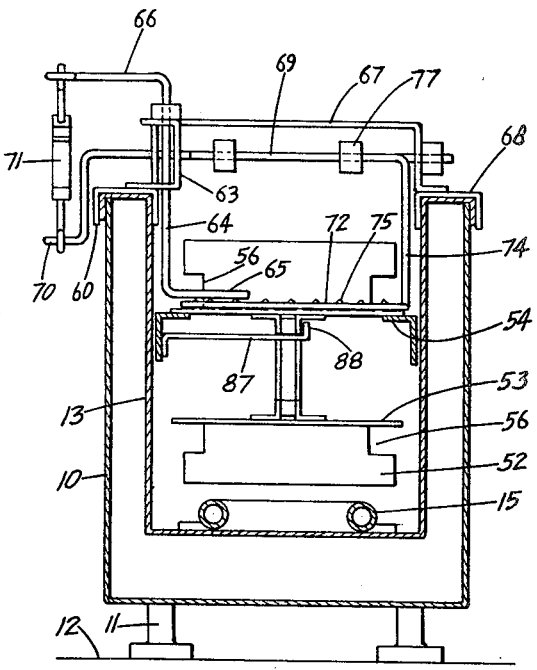
FIGURE 4 is a transverse vertical section on an enlarged scale, taken on the line 4—4 of FIGURE 2 and in the direction of the arrows, showing details of construction of the doughnut turning mechanism.

An actuating arm 65 is engaged by each paddle as it moves downstream, the arm is moved in a counterclockwise direction (as seen in FIGURE 5) rotating on a vertical axis. As this movement is translated through the adjustable connecting link 71, crank 70 causes the central segment 69 of the lifting arm crank to rotate clockwise (as seen in FIGURES 6 and 7) to lift arm 72. Because of the continuous movement of the transport means, by the time the lifting arm lifts far enough to engage the under surface of the partially cooked doughnut 76 more than one-half of the mass of the doughnut is downstream from the lifting arm. The lifting arm thus serves as a pivot point about which the partially cooked doughnut turns and is flipped over into the cooking medium on its opposite side. A plurality of rotatable rings or collars 77 surrounding the central crank arm segment 69 assist in guiding the overturned doughnut back into the fat and under the bridge.

When the actuating arm 65 is released from engagement with the paddle 52, it snaps back into its original position ready for engagement by the next succeeding paddle due to the release of the lifting arm which is then permitted to fall by gravity back to its at-rest position. By the time the lifting arm is returned to its at-rest position, the paddle which actuated the lifting movement will have passed under the lifting arm which is then ready for turning over the next succeeding partially cooked doughout.

It will be seen that each doughnut is turned over into the same area or compartment from which it was lifted. As seen in FIGURE 8, timing means are provided in conjunction with the drive for the doughnut transport means to synchronize operation of the dough extruder 21 with movement of the doughnut transport means. A sprocket wheel 80 is secured to the reduced speed drive shaft 81 of the motor driven gear box which is coupled to the drive shaft 44 of the transport means. A sprocket chain 82 is driven by sprocket wheel 80. The opposite end of the chain loop slides around a shaft 83 moving in the same direction as transport means sprocket chain 42.

A cam member 84 is fixed to the outer perimeter of sprocket chain 82 and moves into engagement with a switch 85 to actuate the same to initiate the operation of motor 35 to drive the shaft of the dough extruder through one cycle. Sprocket chain 82 is of such a length and cam member 84 is so located that switch 85 is actuated just prior to the time that each paddle 52 emerges from the lower flight of its passage to begin its downstream path toward the discharge end of the machine. Thus, just after each ring-shaped piece of dough is dropped into the vessel, a paddle appears in place to propel it along toward the discharge end of the machine.

In order to provide added stability, a horizontal guide plate 87 is positioned under the sprocket chain 42 adjacent the actuating arm 65. As the actuating arm engages each paddle, this tends to exert a force on the paddle and sprocket chain in the direction toward the opposite side of the vessel. To limit this movement, an upstanding lip 88 which engages the side of chain 42 is provided at the end of plate 87. Thus, the paddles are prevented from being pushed over to the opposite side where they might interfere with operation of the lifting arm.

In the operation of the doughnut making machine, according to the present invention, the machine is placed on any convenient table-top or counter space, plugged into an ordinary 110 volt electrical outlet, filled with cooking fat or oil and the heating element is turned on and set to the desired temperature. While the cooking medium is being brought up to cooking temperature, the dough is prepared and charged into the extruder 21. When the cooking fat or oil has reached the proper temperature, the transport means is turned on. Cam 84 on the timing device then actuates the dough extruder and a ring-shaped piece of dough is expelled from the bottom of the extruder into the cooking medium. The extruder turns itself off as shaft 30 reaches the upward end of each stroke.

As the uncooked dough is propelled downstream being pushed by a paddle 52, it partially cooks and the lower surface which is submerged in the cooking medium is browned. Then, as the paddle engages and moves actuating arm 65, lifting arm 72 is raised to flip the doughnut over to brown the other side and complete the cooking. The doughnut is then lifted up out of the cooking medium and drained and discharged from the end of the machine.

In a typical unit in which the dough extruder has a diameter of about 6 to 7 inches and an overall height of about 7 to 8 inches, the extruder will hold dough enough for about four and one-half dozen doughnuts. This dough extruder used in conjunction with a vessel whose length is about 30 inches whose transport means is driven so as to complete one cycle about every five minutes will produce about eighteen dozen doughnuts per hour. The machine can be operated according to demand to supply freshly baked doughnuts as required.

It is apparent that many modifications and variations of this invention as hereinbefore set forth may be made without departing from the spirit and scope thereof.

We claim:

1. A doughnut making machine comprising:
    (A) an elongated relatively deep vessel adapted to contain a liquid cooking medium;
    (B) heating means for said vessel for heating said cooking medium;
    (C) dough expelling means mounted above said vessel adjacent one end for periodically discharging a formed piece of uncooked dough into the vessel;
    (D) power means to drive said dough expelling means;
    (E) transport means extending lengthwise of said vessel for moving said dough along the length of the vessel and discharging the same from the vessel as a cooked doughnut at the opposite end thereof, said transport means comprising:
        (1) an elongated endless drive element extending substantially the length of said vessel,
        (2) means for supporting said drive element at its opposite ends, the first of said means being mounted within the vessel at the dough receiving end, the other of said means being mounted above the vessel at the doughnut discharge end, one of said support means being a drive means,
(3) a plurality of transverse outwardly extending paddles carried by the outer perimeter of said drive element, said paddles being equally spaced apart to define doughnut receiving areas and extending substantially across the width of said vessel, and
(4) parallel horizontal guide means for said paddles disposed on opposite sides of said vessel for guiding the paddles through the liquid cooking medium and parallel upwardly inclined guide means for guiding up and out of the cooking medium to discharge a dry cooked doughnut at the discharge end of the vessel:
  (a) said paddles including a flat transversely and horizontally extending base plate and a pusher element extending at approximately a right angle thereto,
  (b) the opposite ends of the base plates of said paddles resting upon and movable along the upper surface of the guide means between the dough receiving end of the vessel and an intermediate point between the ends of the vessel, and
  (c) the opposite ends of the base plates of the paddles bearing against and movable along the bottom surface of the guide means between the intermediate point and the doughnut discharge end of the vessel;
(F) power means to drive said transport means;
(G) turn-over means mounted on the vessel intermediate of the ends thereof for turning partially cooked doughnuts over in place; and
(H) timing means to synchronize expulsion of formed dough with movement of said transport means.

2. A doughnut making machine according to claim 1 further characterized in that:
(A) said elongated endless drive element is a single sprocket chain;
(B) at least one of said support means for said drive element is a sprocket wheel journaled for rotation on a horizontal axis extending transversely of said vessel; and
(C) the sprocket wheel is mounted above the vessel at the discharge end and is a drive sprocket detachably connected to motor means to drive the sprocket chain.

3. A doughnut making machine according to claim 1 further characterized in that said timing means is a switch actuated by the drive for said transport means to actuate the dough expelling means to drop dough only in a doughnut receiving area between two adjacent paddles.

4. A doughnut making machine comprising:
(A) an elongated relatively deep vessel adapted to contain a liquid cooking medium;
(B) heating means for said vessel for heating said cooking medium;
(C) dough expelling means mounted above said vessel adjacent one end for periodically discharging a formed piece of uncooked dough into the vessel;
(D) power means to drive said dough expelling means;
(E) transport means extending lengthwise of said vessel for moving said dough along the length of the vessel and discharging the same from the vessel as a cooked doughnut at the opposite end thereof, said transport means comprising:
  (1) an elongated endless drive element extending substantially the length of said vessel,
  (2) means for supporting said drive element at its opposite ends, the first of said means being mounted within the vessel at the dough receiving end, the other of said means being mounted above the vessel at the doughnut discharge end, one of said support means being a drive means,
  (3) a plurality of transverse outwardly extending paddles carried by the outer perimeter of said drive element, said paddles being equally spaced apart to define doughnut receiving areas and extending substantially across the width of said vessel, and
  (4) parallel horizontal guide means for said paddles disposed on opposite sides of said vessel for guiding the paddles through the liquid cooking medium and parallel upwardly inclined guide means for guiding up and out of the cooking medium to discharge a dry cooked doughnut at the discharge end of the vessel;
(F) power means to drive said transport means;
(G) turn-over means mounted on the vessel intermediate of the ends thereof for turning partially cooked doughnuts over in place, said turn-over means comprising:
  (1) actuating arm means carried by first pivotally mounted crank arm means and lying in the path of said paddles to actuate the turn-over means,
  (2) transverse lifting arm means carried by further pivotally mounted crank arm means and extending between said parallel horizontal guide means, and
  (3) link means connecting said crank arm means; and
(H) timing means to synchronize expulsion of formed dough with movement of said transport means.

5. A doughnut making machine according to claim 4 further characterized in that:
(A) said first crank arm means is mounted adjacent one side of said vessel to rotate about a vertical axis;
(B) said further crank arm means is mounted above the vessel to rotate about a horizontal axis; and
(C) said link means is pivotally connected to each of said crank means.

6. A doughnut making machine according to claim 5 further characterized in that:
(A) said actuating arm is mounted to move in a horizontal plane, pivoting on the vertical axis of the first crank arm means, actuated by movement of each paddle toward the discharge end of the vessel;
(B) said lifting arm is mounted to describe a cylindrical arc about the horizontal axis of the further crank arm means, said lifting arm being raised higher than the upper edge of each paddle to permit the same to pass under the lifting arm, said lifting arm simultaneously lifting each doughnut and turning it into the same doughnut receiving area between two adjacent paddles.

7. A doughnut making machine according to claim 4 further characterized in that said paddles include a flat transversely and horizontally extending base plate and a pusher element extending at approximately a right angle thereto.

8. A doughnut making machine according to claim 7 further characterized in that:
(A) the opposite ends of the base plates of said paddles rest upon and are moved along the upper surface of the guide means between the dough receiving end of the vessel and an intermediate point between the ends of the vessel, and
(B) the opposite ends of the base plates of the paddles bear against and are moved along the bottom surface of the guide means between the intermediate point and the doughnut discharge end of the vessel.

9. A doughnut making machine according to claim 4 further characterized in that:

(A) said elongated endless drive element is a single sprocket chain;
(B) at least one of said support means for said drive element is a sprocket wheel journaled for rotation on a horizontal axis extending transversely of said vessel; and
(C) the sprocket wheel is mounted above the vessel at the discharge end and is a drive sprocket detachably connected to motor means to drive the sprocket chain.

10. A doughnut making machine according to claim 4 further characterized in that said timing means is a switch actuated by the drive for said transport means to actuate the dough expelling means to drop dough only in a doughnut receiving area between two adjacent paddles.

References Cited

UNITED STATES PATENTS

| | | | |
|---|---|---|---|
| 1,356,573 | 10/1920 | Wallace | 99—405 |
| 1,506,232 | 8/1924 | Fleming | 99—405 |
| 1,674,555 | 6/1928 | Leone et al. | 99—404 XR |
| 2,042,262 | 5/1936 | Lagaard | 99—354 |
| 3,154,187 | 10/1964 | Roth | 99—354 XR |
| 3,283,695 | 11/1966 | Belshaw et al. | 99—354 |

BILLY J. WILHITE, Primary Examiner

U.S. Cl. X.R.

99—405

PO-1050
(5/69)

UNITED STATES PATENT OFFICE
CERTIFICATE OF CORRECTION

Patent No. 3,504,619  Dated April 7, 1970

Inventor(s) Amos M. Fester and Paul D. Brogard

It is certified that error appears in the above-identified patent and that said Letters Patent are hereby corrected as shown below:

Column 3, line 26, "spiece" should be --piece--

Column 3, line 37, "frame-" should be --framework--

Column 4, line 13, "upward" should be --upwardly--

Column 4, line 31, "return" should be --turn--

SIGNED AND
SEALED
AUG 18 1970

(SEAL)
Attest:

Edward M. Fletcher, Jr.
Attesting Officer

WILLIAM E. SCHUYLER, JR.
Commissioner of Patents